(12) United States Patent
Goodwin (10) Patent No.: US 10,778,514 B1
(45) Date of Patent: Sep. 15, 2020

(54) UNIVERSAL CONFIGURATIONS

(71) Applicant: Noble Systems Corporation, Atlanta, GA (US)

(72) Inventor: Michael C. Goodwin, Edmond, OK (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 16/549,398

(22) Filed: Aug. 23, 2019

(51) Int. Cl.
*H04L 12/24* (2006.01)
*H04L 29/06* (2006.01)
*H04L 29/08* (2006.01)

(52) U.S. Cl.
CPC .......... *H04L 41/0813* (2013.01); *H04L 67/34* (2013.01); *H04L 69/16* (2013.01)

(58) Field of Classification Search
CPC ...... H04L 41/0813; H04L 69/16; H04L 67/34
See application file for complete search history.

(56) References Cited

U.S. PATENT DOCUMENTS

| | | | |
|---|---|---|---|
| 6,842,769 B1 | 1/2005 | Kim et al. | |
| 7,827,199 B2 | 11/2010 | Yip et al. | |
| 8,583,769 B1 | 11/2013 | Peters et al. | |
| 8,825,816 B2 | 9/2014 | Deutsch et al. | |
| 9,286,327 B2 * | 3/2016 | Kripalani | G06F 11/1456 |
| 2019/0104020 A1 * | 4/2019 | Tero | G06F 11/14 |

* cited by examiner

*Primary Examiner* — El Hadji M Sall (57) ABSTRACT

Various embodiments of the invention provide methods, systems, and computer-program products for providing a configuration over a network to a client application. In various embodiments, a request is received over the network at a configuration management service that includes items that make up the configuration for the application. Accordingly, a determination is made for each item as to whether configuration information for the item can or cannot be overwritten. If the information can be overwritten, then a determination is made as to whether the item is associated with an entity. If so, then information is retrieved that is associated with the item and the entity. If not, then information is retrieved that is associated with the item only. A response is then sent to the client application that includes configuration information for each item that can be overwritten to be used to configure parameters and/or initial settings for the application.

21 Claims, 8 Drawing Sheets

UNIVERSAL CONFIGURATIONS

BACKGROUND

Configuration files are used to configure parameters and initial settings for computer software applications. Some applications may provide tools to create, modify, and verify the syntax of their configuration files. While for other applications, an individual, such as a system administrator, may be expected to create and modify files by hand using some type of text editor. However, using such mechanisms for maintaining configurations files may be disadvantaged. For example, these mechanisms can become quite cumbersome when a modification to a particular configuration involves editing configuration files across multiple machines. For one, some process must be used to track which machines are running the application, and using the configuration file, and where such machines are located. Secondly, the configuration file on each machine must then be edited accordingly one-by-one to implement the modification to the configuration.

Thus, a need in the industry exists for better mechanisms for maintaining configurations for computer software applications across multiple machines. More specifically, a need in the industry exists for better mechanisms that allow for centralized configurations for computer software applications in a manner that requires minimal code change in the applications to support the centralization of configurations while also still supporting individual configuration files for the applications. It is with respect to this and other considerations that the disclosure herein is presented.

BRIEF SUMMARY

In general, embodiments of the present invention provide computer-program products, methods, systems, apparatus, and computing entities for providing a configuration over a network to a client application. In various embodiments, a request is received over the network at a configuration management service. Here, the request includes one or more items that make up the configuration for the client application. Accordingly, a determination is made for each item in the request as to whether the item is associated with a marker indicating configuration information for the item cannot be overwritten by the configuration management service. If the configuration information cannot be overwritten, then no information is retrieved by the service for the item.

However, if the configuration can be overwritten, then in particular embodiments, a determination is made as to whether the item is associated with an entity such as the client application or an instance of the client application. If so, then information is retrieved by the service that is associated with the item and the entity for the configuration information for the item. If the item is not associated with an entity, then information is retrieved by the service that is associated with the item, but is not associated with any entity for the configuration information for the item.

Once each item in the request has been processed, a response is sent to the client application over the network. In various embodiments, the response includes the configuration information for at least the items in the one or more items that are not associated with a marker indicating the configuration information for the items cannot be overwritten by the configuration management service. Accordingly, the configuration information returned in the response is then used to configure at least one of one or more parameters and one or more initial settings for the client application.

Further, in particular embodiments, the configuration management service may broadcast a beacon over the network that is detectable by the client application. Here, the beacon may be broadcasted over the network using a User Datagram ("UDP") protocol and informs the client application that the service is available. In addition, the beacon may provide an endpoint to the client application to use in locating the configuration management service.

Furthermore, in particular embodiments, the request sent from the client application and the response provided by the configuration management service may be sent over the network using a Representational State Transfer ("REST") architectural style. Here, both the request and the response may also be sent over the network using a Transmission Control Protocol ("TCP") connection.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Network Environment

Figure 1:
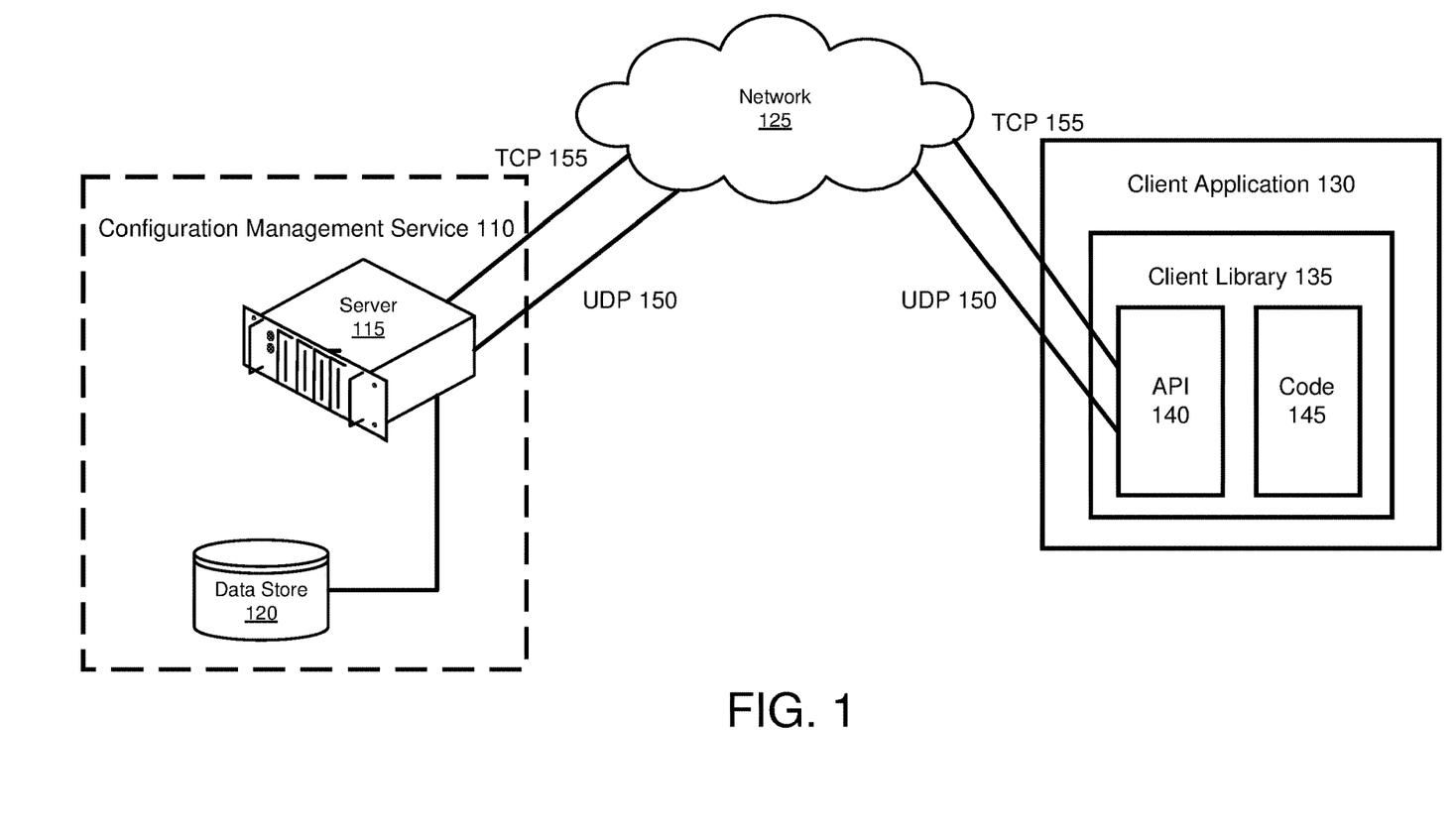
FIG. 1 illustrates a networking environment used in accordance with various embodiments of the present invention.

FIG. 1 illustrates a networking environment that may be used in accordance with the various technologies and concepts disclosed herein. Here, a client application 130 found on a client device is communicating over a network 125 with a server 115 operating for a configuration management service 110. Depending on the embodiment, the network 125 may include one or more of a cellular network, Internet, intranet, Local Area Network, Wide Area Network, or any other form of connecting two or more systems, components, or storage devices together.

Further, depending on the embodiment, the client device on which the client application 130 resides may be a server, personal computer, laptop computer, tablet device, a smartphone, or any other type of computing device. In various embodiments, the client application 130 may make use of one or more client libraries 135. For example, in particular instances, the client application 130 makes use of a client library 135 to interface with the configuration management service 110 to request and implement a configuration for the client application 130.

Depending on the embodiment, the server 115 operating in the configuration management service 110 may run any variety of server or mid-tier applications, including Hypertext Transfer Protocol ("HTTP") servers, data servers, Java servers, and business application servers. Here, the server(s) 115 may be capable of executing programs and/or scripts in response to requests from the client library 135.

As is discussed in further detail herein, the server 115 broadcasts a "beacon" over a User Datagram Protocol ("UDP") connection 150 that publicizes the server's existence and provides a connection endpoint for the client library 135 to use in requesting configuration information from the service 110. Accordingly, in these particular embodiments, the server 115 makes use of UDP broadcasting so that it is able to communicate its existence to a multitude of client applications 130 residing on a multitude of client devices that may make use of the configuration management service 110.

In various embodiments, the client library 135 is configured to listen for the "beacon" upon startup and obtain the connection endpoint from the beacon to use in communicating with the server 115. Here, the client library 135 may include an Application Programming Interface ("API") 140 designed to listen for the beacon broadcasted over the UDP connection 150. In addition, the API 140 may be designed to use the connection endpoint to send a request for configuration information to the configuration management service 110. Accordingly, in particular embodiments, the API 140 may be designed to request and receive the configuration information from the service 110 over a connection different from the UDP connection 150.

For instance, in particular embodiments, the API 140 may be designed to communicate with the server 115 for the configuration management service 110 over a Transmission Control Protocol ("TCP") connection 155 to request and receive configuration information. In these particular embodiments, the API 140 may make use of the Representational State Transfer ("REST") architectural style in requesting configuration information from the server 115. REST facilitates the use of simple Hypertext Transfer Protocol ("HTTP") to make calls between machines. A significant advantage of the REST architecture style is it is platform-independent, language-independent, standards-based, and can easily be used in the presence of firewalls.

Thus, the API 140 for the client library 135 sends a REST request for configuration information over the TCP connection 155 by using the connection endpoint broadcasted in the beacon to direct the request to the server 115 for the configuration management service 110. Here, the REST request may identify a number of items (e.g., from key/value pairs) found in a configuration utilized by the client application 130. In addition, the REST request may identify which of the items have static information (e.g., values) that are not to be overwritten.

In turn, the server 115 retrieves configuration information to be used by the client application 130 based on the items found in the REST request. For instance, in particular embodiments, the server 115 retrieves the configuration information from one or more data stores 120. Here, the one or more data stores 120 may be a device or any combination of devices capable of storing, accessing, and retrieving data. For instance, depending on the embodiment, the data stores 120 may comprise any combination and number of data servers and data storage media in any standard, distributed, or clustered configuration. Although only a single server 115 and data store 120 are shown for the configuration management service 110, it should be understood that several servers, data stores, layers, and/or other components may be involved, which may be chained or otherwise configured to interact and/or perform tasks.

At this point, the server 115 responds to the REST request by providing a response identifying information for one or more of the items found in the request. As a result, the client library 135 in particular embodiments populates a configuration library for the different items based upon the information returned in the response.

Here, in various embodiments, the client library 135 may include programing code 145 that facilitates the library 135 providing the client application 130 with information from the configuration library for a particular configuration item when requested. For instance, the client application 130 may be a .NET framework application in particular embodiments. Accordingly, an object called "ConfigurationManager" may exist that is used by a .NET application to access information for items found in a configuration. In these particular instances, the programming code 145 for the client library 135 may mimic the classes and functions found in the "ConfigurationManager" object and as a result, the client application 130 is able to make use of the programming code 145 found in the client library 135 to retrieve information from the configuration library. Thus, such a configuration may be implemented with relatively minimal code changes to the client application 130, outside of code that may be needed to detect modifications/updates made to the configuration and to process the updates while the client application 130 is running.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Configuration Management Service Module

As previously mentioned, various embodiments of the invention involve a configuration management service 110 that provides configurations for various client applications 130. Here, the service 110 involves making a server 115 available over a network 125 that is configured for receiving requests from client devices, on which client applications 130 reside, and delivering configuration information to these client devices over the network 125 to be used in configuring the client applications 130.

Figure 2:
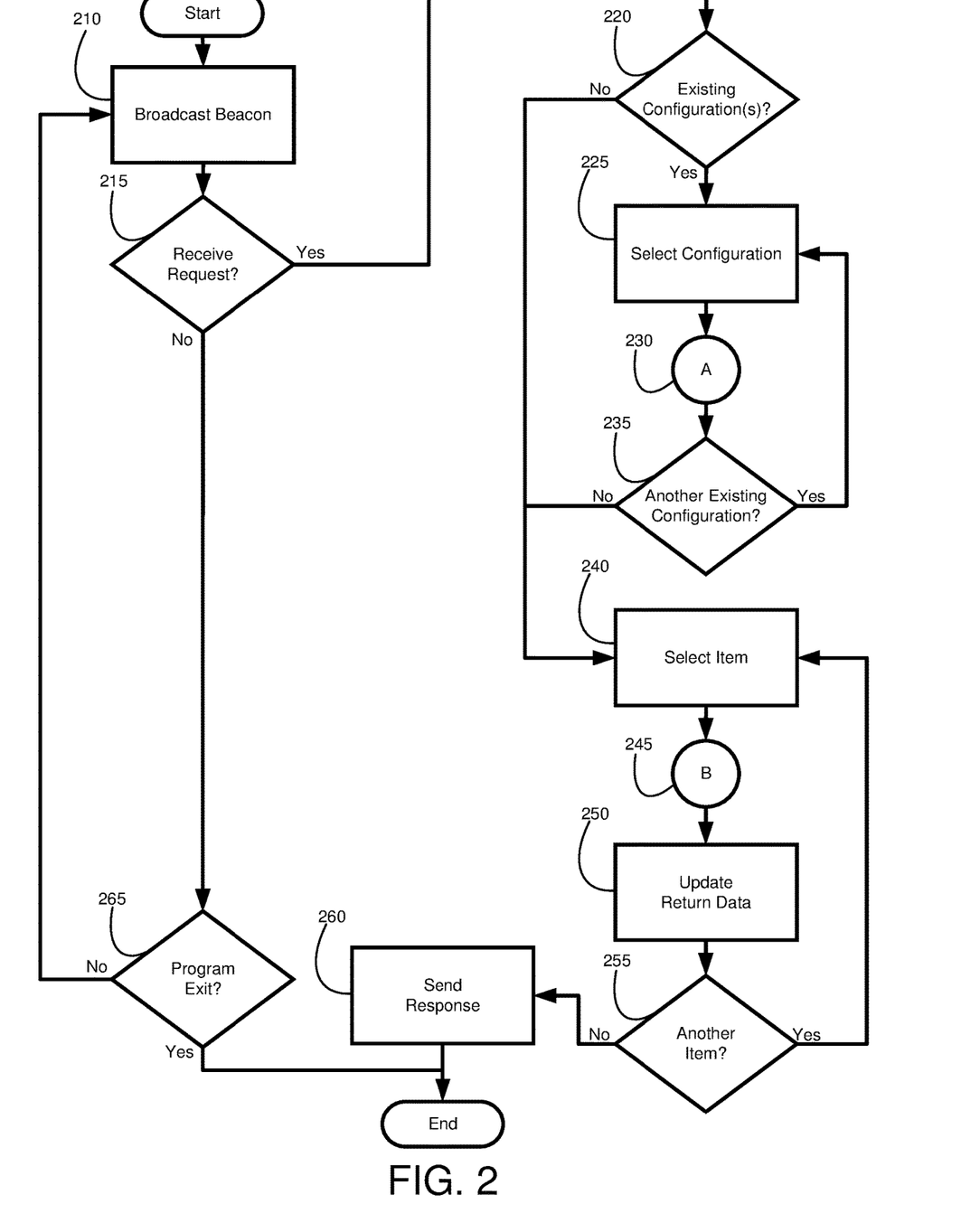
FIG. 2 illustrates a process flow for responding to a request for a configuration in accordance with various embodiments of the invention.

Thus, turning now to FIG. 2, additional details are provided regarding a process flow for responding to a request for a configuration according to various embodiments of the invention. In particular, FIG. 2 is a flow diagram showing a Configuration Management Service ("CMS") module for performing such functionality according to various embodiments of the invention. For example, the flow diagram shown in FIG. 2 may correspond to operations carried out by one or more processors in one or more components, such as the server 115 shown in FIG. 1 operating for the configuration management service 110, as it executes the CMS module stored in the component's volatile and/or nonvolatile memory.

As also previously mentioned, the configuration management service 110 in various embodiments provides a mechanism that allows for a client device to "discover" the service 110 and how to access the service 110. Therefore, the process flow begins in FIG. 2 with the CMS module broadcasting a "beacon" in Operation 210. The beacon is provided to make client devices aware the server 115 is available and how to access it. For instance, in particular embodiments, the beacon is broadcasted over a UDP connection 150 and provides a Uniform Resource Locator ("URL") endpoint that may be used by client device in a call (e.g., a REST request) to reach the server 115. For example, the beacon may provide the URL http://configSvr.service-.com/configurations.

Accordingly, a client application 130 residing on a client device is started up and detects the beacon over the UDP connection 150 and decides to request a configuration from the service 110. Therefore, in particular embodiments, the client application 130 (e.g., a client library 135 for the application 130) sends a request to the server 115 for the configuration management service 110 over a network. Here, as previously mentioned, the request is sent and received over a connection different than the UDP connection 150 in various embodiments. For instance, the request may be sent and received over a TCP connection 155.

Therefore, in particular embodiments, the CMS module determines whether a request has been received from a client application 130 in Operation 215. If not, then the CMS module determines whether the module is experiencing a shutdown in Operation 265. If not, then the CMS module continues to broadcast the beacon and monitor for requests.

However, if the CMS module determines a request has been received in Operation 215, then the module performs operations to process the request. Here, depending on the embodiments, the request may provide different information used in processing the request. For instance, the request may identify a service to be provided by the CMS module such as, for example, GetConfiguration. Further, the request may identify one or more parameters to indicate the arrangement of the configuration used by the requesting client application 130.

For example, configurations are commonly made up of key/value pairs. A key/value pair is a set of two linked data items. The "key" item is a unique attribute/property for some item of data, and the "value" item is the data that is identified for the attribute/property. Therefore, the parameters found in the request may identify the key items for the key/value pairs found in the configuration used by the client application 130. Here, in this example, the CMS module is configured to provide the value for each of the keys identified in the parameters of the request.

In addition, the REST request may provide other information such as an application identifier. The application identifier establishes what client application 130 is requesting the configuration information. The client application 130 may be important because the configuration information for an item (e.g., the value for a particular key) may be dependent on the application 130. Therefore, in these instances, the service 110 may need to be aware of the client application 130 requesting the configuration information so that the correct information may be provided.

Similarly, the request may provide an instance identifier. The instance identifier establishes a particular instance of the client application 130 running on a particular client device. Again, the instance identifier may be important because the configuration information for a particular item may be dependent on the particular instance of the application 130 requesting the configuration information. For example, a configuration item may identify a location of an error log used by the application 130 in recordings errors that occur. Here, the location may be specific with respect to the particular instance of the client application 130 running on a particular client device. Therefore, the service 110 may need to be aware of the instance of the client application 130 requesting the configuration information so that the correct information may be provided.

Accordingly, other identifiers may be provided in the request depending on the embodiment. For example, a user identifier may be provided if certain configuration items are dependent on the current user running the client application 130. Those of ordinary skill in the art can envision other identifiers that may be needed to correctly provide configuration information in light of this disclosure.

Finally, the request may provide existing configuration(s) for an entity such as a client application 130 or an instance of the client application 130 in particular embodiments. The existing configuration(s) may be helpful in identifying configuration items that are specific to a particular application 130, instance, user, etc. For example, the request may provide an existing configuration along with an application identifier. Here, the existing configuration may only identify items (e.g., keys and their corresponding values) in the configuration that are specific to the requesting client application 130. Therefore, in this example, the CMS module may be configured to store the items for the client application 130 so that future requests received by a client device executing the same application 130 are provided with the correct information for items found in the configuration to be used by the application 130.

Figure 3:
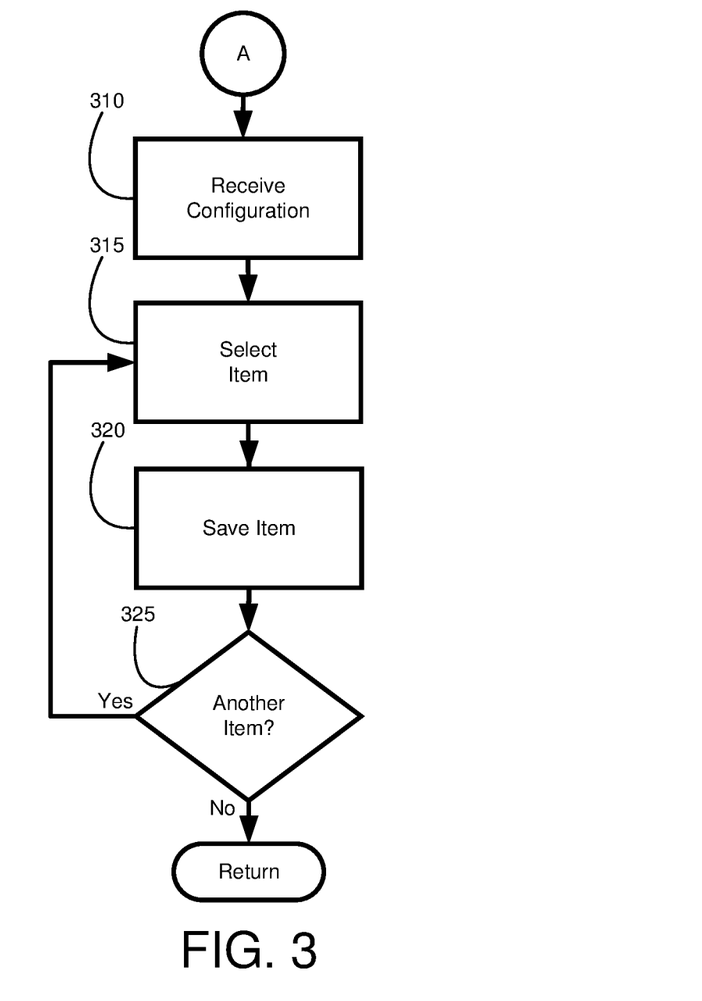
FIG. 3 illustrates a process flow for storing existing configurations in accordance with various embodiments of the invention.

Thus, returning to FIG. 2, the CMS module determines in Operation 220 whether the request includes one or more existing configurations. If so, then the CMS module selects one of the configurations in Operation 225 and stores the configuration in Operation 230. Accordingly, in particular embodiments, the CMS module performs the operation for storing the configuration by invoking a store existing configuration module (FIG. 3). Here, the store existing configuration module stores the items provided for the existing configuration in some type of data store 120 within the configuration management service 110 so that the items can be used for providing configuration information for future requests.

At this point, the CMS module determines whether the request provides any additional existing configurations in Operation 235. If so, then the CMS module returns to Operation 225 and selects the next existing configuration found in the request and repeats the operations to store the items for the existing configuration. However, if no further existing configurations are found in the request, then the CMS module selects an item from the parameters found in the request in Operation 240.

Figure 4:
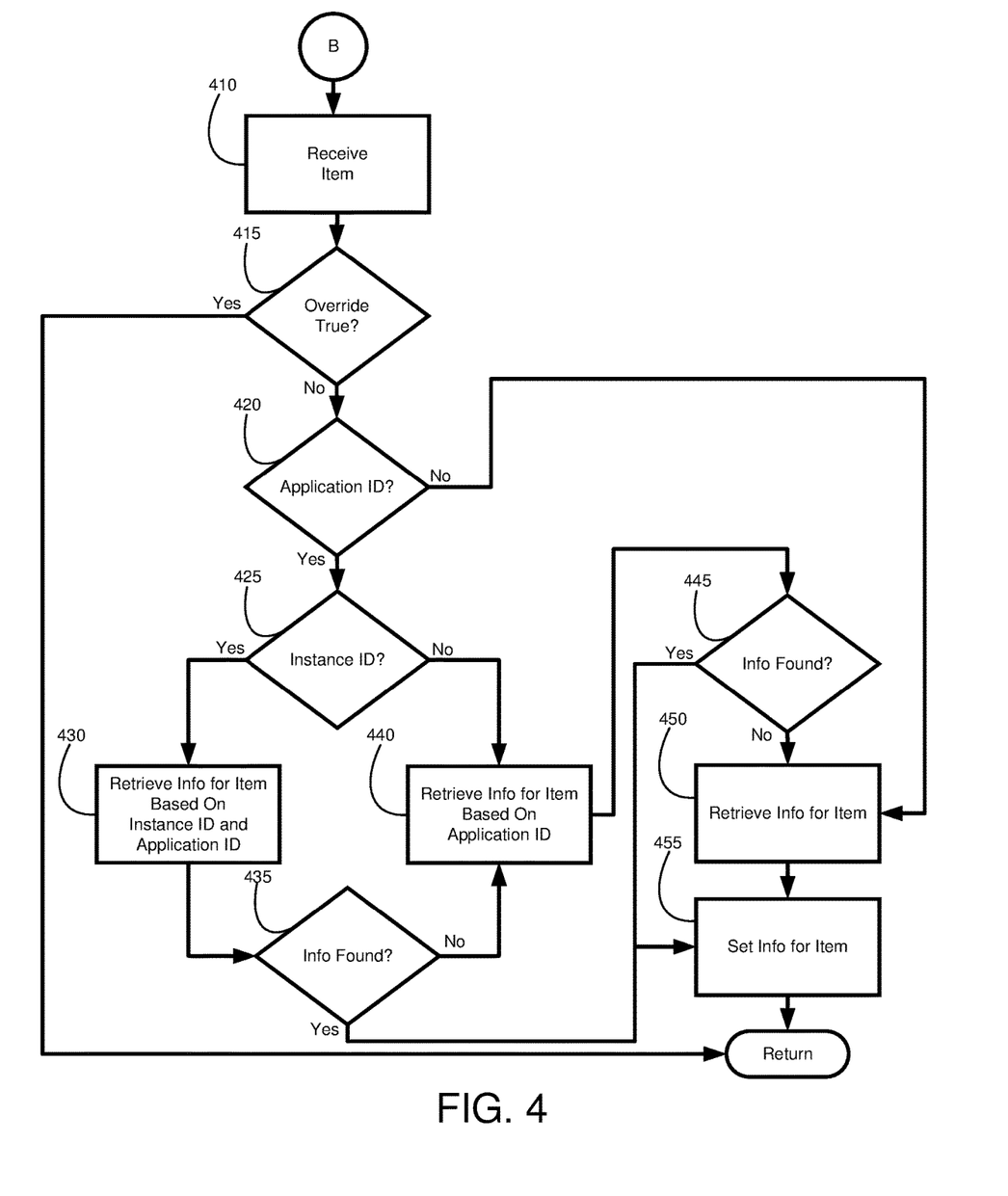
FIG. 4 illustrates a process flow for configuration information for an item in accordance with various embodiments of the invention.

As mentioned, in particular embodiments, the parameters portion of the request identify items that make up the configuration needed by the requesting client application 130. Therefore, the CMS module retrieves needed information for the item in Operation 245. Here, in particular embodiments, the CMS module performs this operation by invoking a retrieve item information module (FIG. 4). In turn, the retrieve item information module retrieves the needed information for the particular item and returns the information to the CMS module. For instance, the item may be a key for a key/value pair found in the configuration for the client application 130. In this instance, the retrieve item information module would retrieve the value for the key and return the value to the CMS module.

Accordingly, the CMS module updates data that is to be returned to the client application in a response for the item in Operation 250. The CMS module then determines whether another item is found in the parameters of the request in Operation 255. If so, then the CMS module returns to Operation 240, selects the next item found in the parameters, and repeats the operations to query the needed information for the newly selected item.

Once all of the items have been processed for the request, the CMS module sends a response back to the requesting client application in Operation 260. Again, in particular embodiments, the response is sent as a REST response over the TCP connection 155. The configuration information provided in the response entails information with respect to each of the items found in the request sent to the CMS module. This information is then used as the configuration for the client application 130.

Store Existing Configuration Module

Turning now to FIG. 3, additional details are provided regarding a process flow for storing information for an existing configuration according to various embodiments of the invention. In particular, FIG. 3 is a flow diagram showing a Storing Existing Configuration ("SEC") module for performing such functionality according to various embodiments of the invention. For example, the flow diagram shown in FIG. 3 may correspond to operations carried out by one or more processors in one or more components, such as the server 115 shown in FIG. 1 operating for the configuration management service 110, as it executes the SEC module stored in the component's volatile and/or nonvolatile memory.

As the reader may recall, the CMS module may invoke the SEC module in various embodiments to store information for an existing configuration provided in a request received by the CMS module from a client application 130 (client library 135 of a client application 130). However, with that said, the SEC module may be invoked by a different module or as a stand-alone module in other embodiments.

Here, the process flow begins with the SEC module receiving the configuration in Operation 310. The configuration may be provided in a number of different formats. However, in general, the configuration provides information on the items that make up the configuration. For instance, the configuration may provide the key/value pairs that make up the configuration.

Accordingly, the SEC module selects an item found in the configuration in Operation 315. Once selected, the SEC module then saves the information for the item in Operation 320. For instance, returning to the example in which each item is a key/value pair found in the configuration. Here, the SEC module may first make a determination as to whether the key already exists in the configuration information already stored for the configuration management service 110. In some instances, the configuration may be associated with a particular entity such as a client application 130 or an instance of a client application 130. Therefore, the SEC module's determination may be made as to whether the key already exists with respect to the particular entity.

If the key does already exist, then the SEC module replaces the value for the key found in the service's storage with the value provided in the received configuration. However, if the key does not exist in the service's storage, then the SEC module saves both the key and value in the storage. Depending on the embodiment, the storage may be one or more of any type of data store 120 found within the configuration management service 110.

For example, in particular embodiments, the storage may entail one or more databases or files residing on some type of data store 120 within the configuration management service 110. Here, an item may be represented as a record in a database table or a file and may or may not be associated with an identifier for an entity, such as an application identifier or an instance identifier. For instance, the storage may entail a database table with each record representing an item having the columns "key," "value," "application id," and "instance id." From this table, the service 110 is then able to pull values for various keys to build up a configuration for a given request received from a client application 130.

Returning to FIG. 3, once the SEC module saves the item, the module determines whether another item exists for the configuration in Operation 325. If so, then the SEC module returns to Operation 315, selects the next item for the configuration, and repeats the operations to have the information for the item stored. The SEC module repeats this process flow until the information for all of the items found in the configuration has been saved.

Retrieve Item Information Module

Turning now to FIG. 4, additional details are provided regarding a process flow for retrieving information for an item of a configuration according to various embodiments of the invention. In particular, FIG. 4 is a flow diagram showing a Retrieve Item Information ("RII") module for performing such functionality according to various embodiments of the invention. For example, the flow diagram shown in FIG. 4 may correspond to operations carried out by one or more processors in one or more components, such as the server 115 shown in FIG. 1 operating for the configuration management service 110, as it executes the RII module stored in the component's volatile and/or nonvolatile memory.

As the reader may recall, the CMS module may invoke the RII module in various embodiments to retrieve information for an item found in a configuration request received by the CMS module from a client application 130 (client library 135 of a client application 130). However, with that said, the RII module may be invoked in other embodiments by a different module or as a stand-alone module.

Here, the process flow begins with the RII module receiving the item in Operation 410. Depending on the embodiment, additional information may be provided along with the item to help identify whether the item of interest is associated with a particular entity such as a particular client application 130 or a particular instance of a client application 130. In addition, information (e.g., a marker) may be provided along with the item indicating whether the item can or cannot be overwritten.

For example, this information may be provided as a Boolean override value that is set to true or false. If the override value is set to true, then the item should not be overwritten. Accordingly, this particular value is provided in various embodiments to furnish the users of a particular client application 130 with local control over the setting for a particular item in the configuration for the application 130. In some instances, a user (e.g., client administrator) may want to ensure that a particular item of a configuration is not changed (overwritten) by some external source. Therefore, in these instances, the user can set the override value for the item to true to signal to the configuration management service 110 not to change the item, no matter what is found for the item in the service's stored configuration information.

Therefore, the process flow shown in FIG. 4 continues with the RII module determining whether the override value has been set to true for the item in Operation 415. If so, then the RII module simply ends the process flow. However, if the override value is not set to true, then the RII module goes about retrieving the service's stored configuration information for the received item.

As the reader may recall, in particular embodiments, configuration information may be stored for an item with respect to some entity such as a particular client application 130, a particular instance of a client application 130, a particular user of a client application 130, etc. Such association of items with entities allows for customized configurations to be implemented for the entities. In addition, the entities may be viewed in a hierarchical fashion. For instance, an item found in a configuration for a particular instance of a client application 130 may have a higher authority over the same item found in a configuration for the same client application 130 alone. Therefore, if the service 110 were to receive a request identifying both the instance and the client application 130, the information stored for the item associated with the instance would be returned for the item over the information stored for the item associated with the client application 130 alone.

Furthermore, the configuration information stored for an item may be associated with a combination of entities to better identify the item is part of a customized configuration. For instance, configuration information may be stored by the service 110 for an item associated with an instance of a client application 130 along with both the appropriate instance identifier and appropriate application identifier for the item. Here, the RII module would retrieve the appropriate configuration information for the item using both the appropriate instance identifier and the appropriate application identifier.

With this in mind, looking now at the process flow shown in FIG. 4, the RII module is configured to first consider whether the request received from the client application 130 provides an application identifier in Operation 420. In some instances, the configuration management service 110 may receive a request for a general configuration that is not associated with a particular client application 130. In these instances, the response to the request would provide default configuration information for each of the items found in the request. However, such requests may only occur occasionally (or not at all) and most requests are typically received with an application identifier.

Therefore, if the request was received with an application identifier, then the RII module determines whether the request was also received with an instance identifier in Operation 425. If so, then the RII module retrieves configuration information for the item based on both the application identifier and the instance identifier in Operation 430. The RII module then checks as to whether configuration information was found as a result of conducting the retrieval in Operation 435. If so, then the RII module sets the information for the item to the retrieved information in Operation 455.

However, if the request was not received with an instance identifier or the retrieval conducted for the item based on both the application identifier and the instance identifier did not return a result, then then the RII module retrieves configuration information for the item simply based on the application identifier in Operation 440. The RII module then checks as to whether configuration information was found as a result of conducting the retrieval in Operation 445. If so, then the RII module sets the information for the item to the retrieved information in Operation 455.

However, if configuration information was not found as a result of conducting the retrieval, then the RII module retrieves the service's configuration information that is associated with neither an instance identifier nor an application identifier. Typically, a configuration item may be assigned some general (default) setting regardless of the client application 130. Therefore, the process flow shown in FIG. 4 is configured to set an item for a configuration to the general setting when the configuration is not associated with a particular client application 130 or a particular instance of the client application 130.

Thus, the RII module retrieves the service's configuration information for the item wherein the item is not associated with an application identifier or a combination of an instance and application identifiers in Operation 450. Once retrieved, the RII module sets the information for the item to the default setting in Operation 455.

An example is now provided to demonstrate the hierarchical approach used in various embodiments based on the process flow shown in FIG. 4 to set the information for a particular item in a requested configuration. In this example, the items in the configuration are key/value pairs. Here, the RII module has received the key "poll interval" and the service's stored configuration information has three entries for this particular key. The first entry is associated with both an instance identifier "ClientMachine1" and an application identifier "ClientApplication1," and a value of fifty. The second entry is associated with only the application identifier "ClientApplication1," and a value of ten. The third entry is not associated with any entity identifiers, but is associated with the value fifteen.

Therefore, if the service 110 receives a request for a configuration that includes as a parameter the key "poll interval" with an instance identifier equal to "ClientMachine1," an application identifier equal to "ClientApplication1," and a Boolean override value set to true, then no value found in the service's configuration information would be returned for the key since the key cannot be overwritten. It is noted that in particular embodiments, the key "poll interval" may not even be included in the parameters of the request since it cannot be overwritten. In addition, in particular embodiments, values (information) may also be provided along with each key (item) found in the parameters of the request. In these instances, the value provided in the request may be returned as the value for this key since the value cannot be overwritten by any information found by the service 110.

Continuing with the example, if the service 110 instead receives a request for a configuration that includes as a parameter the key "poll interval" with an instance identifier equal to "ClientMachine1," an application identifier equal to "ClientApplication1," and a Boolean override value set to false. Then in this instance, the value fifty would be returned for the key since the application identifier and instance identifier provided in the request match the identifiers for the first entry.

However, if the service 110 instead receives a request for a configuration that includes as a parameter the key "poll interval" with an instance identifier equal to "ClientMachine2," an application identifier equal to "ClientApplication1," and a Boolean override value set to false, then the value ten would be returned for the key. This is because the application identifier and instance identifier provided in the request do not match both of the identifiers for the first entry. However, the application identifier provided in the request does match the application identifier for the second entry. These two examples demonstrate how items of a configuration can be customize for a particular instance of a client application 130 or just the client application 130 itself.

Finally, if the service 110 receives a request for a configuration that includes as a parameter the key "poll interval" with instance identifier equal to "ClientMachine2," an application identifier equal to "ClientApplication2," and a Boolean override value set to false, then the value fifteen would be returned for the key. Since neither the instance identifier nor the application identifier match the identifiers for the first and second entries, then the value for the third entry is applicable. In particular instances, the third entry may be viewed as a default setting for the key "poll interval" since the entry is not tied to any specific entity (e.g., the third entry is not tied to any specific instance of a client application 130 or client application 130).

As previously noted, other entities may be used to further customize a configuration. For example, a configuration can be associated with a particular user of a client application 130. Here, a user identifier may be provided along with the request and the process flow shown in FIG. 4 could be modified to include a check as to whether the request includes a combination of a user identifier, instance identifier, and application identifier, and whether the service has information stored for the item associated with the combination of identifiers.

API Module of Client Library

Figure 5:
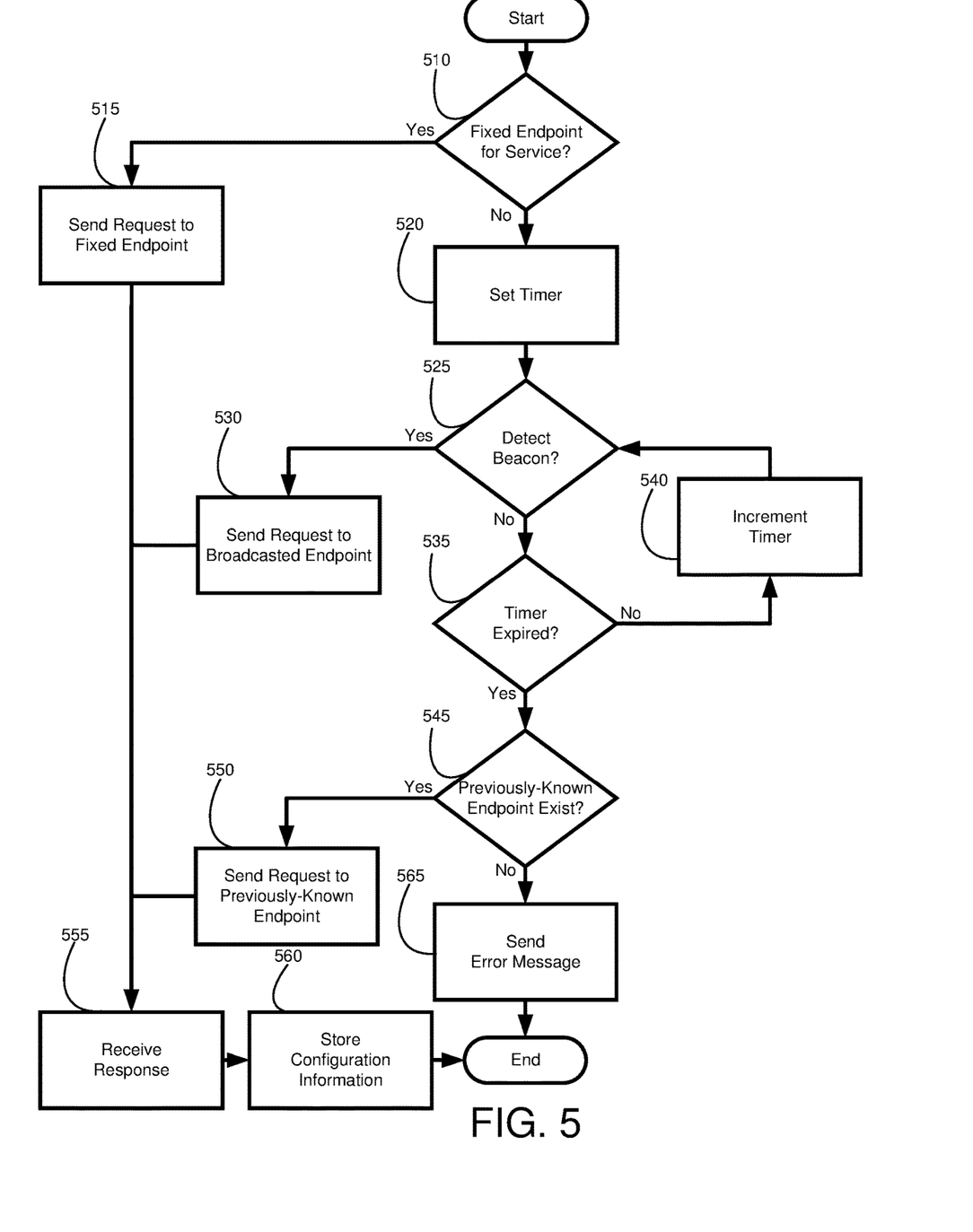
FIG. 5 illustrates a process flow for sending a request for a configuration in accordance with various embodiments of the invention

As previously mentioned, various embodiments of the invention involve a client library 135 that is consumed by a client application 130 and is configured to request configurations from a configuration management service 110 and to provide the client application 130 with configuration information as needed. Thus, turning now to FIG. 5, additional details are provided regarding a process flow for sending a request for configuration information to a service 110 according to various embodiments of the invention. In particular, FIG. 5 is a flow diagram showing an API module of the client library 135 for performing such functionality according to various embodiments of the invention. For example, the flow diagram shown in FIG. 5 may correspond to operations carried out by one or more processors in one or more components, such as a client device on which a client application 130 resides, as it executes the API module of the client library 135 stored in the component's volatile and/or nonvolatile memory.

Specifically, the process flow shown in FIG. 5 is with respect to operations performed by the API module upon startup. Thus, the process flow begins with the API module determining whether the client application 130 and/or client library 135 has a fixed endpoint to use for service in Operation 510. As previously mentioned, various embodiments of the invention involve the configuration management service 110 broadcasting a beacon to notify clients of its availability. Here, in particular instances, the beacon provides an endpoint (e.g., a URL) that can be used by clients as a location for sending requests to reach the service 110. However, in some of these instances, a client application 130 and/or client library 135 may be configured with a fixed endpoint to use instead of the endpoint found in the beacon. If so, then the fixed endpoint should be used to obtain configuration information for the client application 130.

Therefore, if the API module determines the client application 130 and/or client library 135 has a fixed endpoint, the API module sends a request for configuration information to the configuration management service 110 using the fixed endpoint in Operation 515. As previously mentioned, the request may include different information depending on the embodiment. However, in general, the request typically includes a set of parameters identifying one or more items that make up the configuration of the client application 130 for which the client application is seeking configuration information from the service 110.

Accordingly, the API module may be configured to generate the request in a number of different ways depending on the embodiment. For instance, in particular embodiments, the configuration may be filed-based and the API module may be configured to parse the items from the configuration file to include in the request. While in other embodiments, the items for the configuration may be stored in a structured repository of information such as, for example, one or more tables in a database. Here, the API module may be configured to query the items from the tables in the database to include in the request. In addition, the API module may or may not be configured to include the current configuration setting for each item (e.g., the current value of each key).

Furthermore, the API module may be configured to select certain items (and/or not select certain items) to include in the request. For example, some of the items that make up the configuration may be designated as fixed and are not to be overwritten by any external source. Therefore, in particular embodiments, the API module may be configured to not include such items in the request. While in other embodiments, the API module may be configured to include such items, but to indicate the items are fixed (e.g., setting a Boolean override value to true).

Depending on the embodiment, the request may be sent over a number of different network connections, using a number of different protocols. For instance, as previously discussed, the request may be sent over a TCP connection as a REST request. As noted, various embodiments make use of a REST request because a significant advantage of the REST architecture style is it is platform-independent, language-independent, standards-based, and can easily be used in the presence of firewalls.

Returning to Operation 510, if the client application 130 and/or client library 135 is not configured with a fixed endpoint, then the API module sets a timer in Operation 520. This timer is used to set a limit (e.g., five seconds) on the amount of time the API module searches for the beacon being sent by the configuration management service 110. As previously discussed, the configuration management service 110 broadcasts out a beacon in various embodiments over a UDP connection 150 that provides an endpoint for locating the service 110 over a network 125. Thus, in Operation 525, the API module determines whether or not it has detected the service's beacon.

If so, then the API module sends a request for configuration information to the configuration management service 110 using the endpoint broadcasted in the beacon in Operation 530. In addition, the API module may record the broadcasted endpoint in particular embodiments. The API performs this operation in these embodiments so that the module is still aware of the endpoint (is still able to locate the service 110) in instances where the API module may not be able to detect the service's beacon.

However, if the API module is not able to detect the beacon, then the API module determines whether the timer has expired in Operation 535. If the timer has not expired, then the API module increments the timer in Operation 540 and continued to listen for the beacon.

If the API module is unable to detect the beacon before the timer expires, then the API module determines whether a previously-known endpoint exists (e.g., has been recorded) in Operation 545. If so, then the API module sends the request to the configuration management service 110 using the previously-known endpoint in Operation 550. If a previously-known endpoint does not exist, the API module sends an error message indicating an endpoint for the configuration management service 110 is not available in Operation 565.

Upon sending a request to the configuration management service 110, the API module then waits for a response to the request. Accordingly, the API module receives the response from the configuration management service 110 in Operation 555. At that point, the API module stores the configuration information returned in response to Operation 560.

Accordingly, the API module may store the configuration information returned in the response differently depending on the embodiment. For instance, in particular embodiments, the API module may store the configuration information in a configuration file that is then used in a conventional manner by the client application 110. While in other embodiments, the API module may store the configuration information in two separate files (e.g., an application configuration file and a service configuration file) and information is drawn from both files by the client application 110 as needed. While still in other embodiments, the API module may be configured to store the configuration information in some type of structured repository such as a database.

Figure 6:
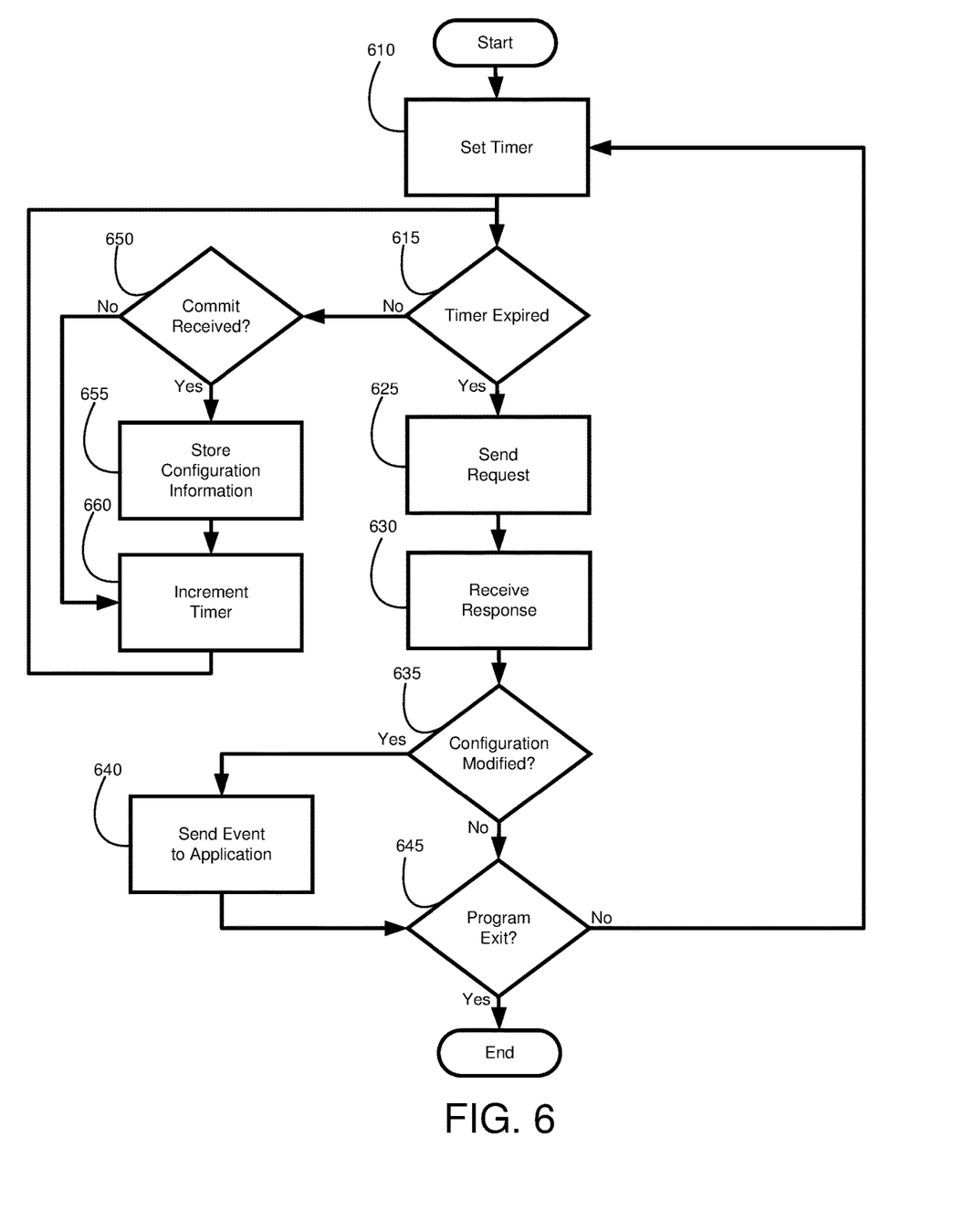
FIG. 6 illustrates a process flow for checking for configuration updates in accordance with various embodiments of the invention.

The client library 135 may be configured in various embodiments to continue to run in the background once the client application 130 has been started. Such a configuration allows for the detection of any revisions/updates made with respect to the items found in the configuration for the client application 130. Therefore, turning now to FIG. 6, additional details are provided regarding a process flow for checking for configuration updates according to various embodiments of the invention. In particular, FIG. 6 is a flow diagram showing the API module of the client library 135 for performing such functionality according to various embodiments of the invention. For example, the flow diagram shown in FIG. 6 may correspond to operations carried out by one or more processors in one or more components, such as a client device on which a client application 130 resides, as it executes the API module of the client library 135 stored in the component's volatile and/or nonvolatile memory.

The particular process flow shown in FIG. 6 is configured to check for updates/revisions made to the configuration after a set time period. For instance, depending on the embodiment, the time period may be set at ten minutes, one hour, four hours, ten hours, etc. Therefore, the process flow begins with the API module setting a timer in Operation 610. The module then checks to see if the timer has expired in Operation 615.

If the timer has expired, the API module sends a request for configuration information to the configuration management service 110 in Operation 625. Accordingly, the API module receives a response from the service in Operation 630 and interrogates the response to determine whether the configuration has been modified (updated/revised) in Operation 635. For instance, in particular embodiments, the API module is configured to compare the information provided for each item found in the response to the information stored for the item (e.g., configured to compare the value for each key found in the response to the value stored for the item).

If a modification is found, then the API module sends an event to the client application 130 to inform the application 130 of the modification to the configuration in Operation 640. In turn, the client application 130 may be configured to handle the event differently depending on the circumstances in which the client application is operating. For instance, the client application 130 may be configured to implement the modification to the configuration at a time when a reload of the configuration can be performed so that the modification does not cause detrimental effects on the application 130. Therefore, the API module is configured in various embodiments to set in a type of "holding pattern" with respect to the modification to the configuration and not commit the modification until the client application 130 has indicated to do so. At this point, the API module determines if the application has exit in Operation 650. If not, then the module returns to Operation 610 and re-sets the timer.

Returning to Operation 615, if instead the timer has not expired, then the API module determines whether an indication has been received from the client application 130 to commit a modification to the configuration in Operation 650. As noted, in various embodiments, the client application 130 is in control of when a modification to the configuration is implemented so that the modification does not adversely affect the application 130. Therefore, when the client application 130 is ready to commit the modification to the configuration, the application 130 sends an indication to the client library 135 to do so.

In turn, if the API module determines such an indication has been received from the client application 130, then the API module stores the modification to the configuration in Operation 655. The API module then increments the timer in Operation 660 and returns to Operation 615 to determines whether the timer has expired. Accordingly, the API module continues to check for any updates to the configuration until the client application 130 is shut down.

Configuration Information Module of Client Library

Figure 7:
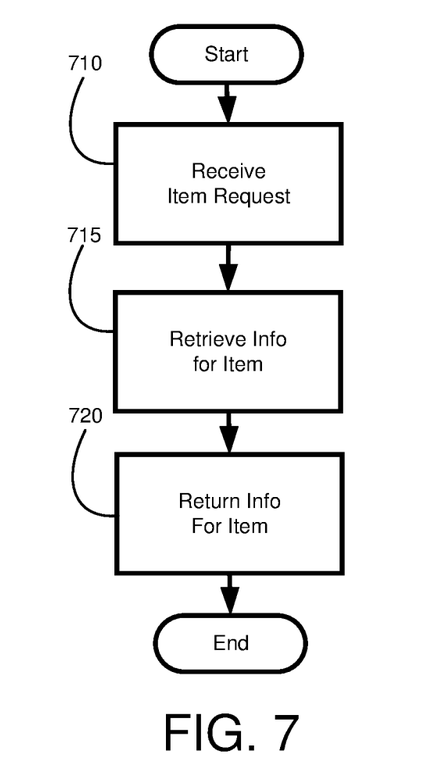
FIG. 7 illustrates a process flow for retrieving information for an item in a configuration in accordance with various embodiments of the invention.

As noted, various embodiments of the invention involve a client library 135 that is also configured to provide the client application 130 with configuration information as needed. Thus, turning now to FIG. 7, additional details are provided regarding a process flow for retrieving configuration information for an item of the configuration according to various embodiments of the invention. In particular, FIG. 7 is a flow diagram showing a configuration information module of the client library 135 for performing such functionality according to various embodiments of the invention. For example, the flow diagram shown in FIG. 7 may correspond to operations carried out by one or more processors in one or more components, such as a client device on which a client application 130 resides, as it executes the configuration information module of the client library 135 stored in the component's volatile and/or nonvolatile memory.

Here, the process flow begins with the configuration information module receiving a request for the configuration information for an item from the client application 130 in Operation 710. For instance, in particular embodiments, the configuration may include key/value pairs and the client application 130 may request a value for a particular key found in the configuration from the configuration information module.

Depending on the embodiment, the configuration information may be stored in some structural framework such as, for example, one or more files or one or more tables found in a database. Therefore, the configuration information module retrieves the configuration information for the item from the framework in Operation 715. For example, returning to an embodiment in which the configuration is made up of key/value pairs and the configuration information is stored in a database, the configuration information queries the value for the requested key from the database. Once the information has been retrieved, the configuration information module returns the information to the client application 130 in Operation 720.

Exemplary Computer Processing System

Figure 8:
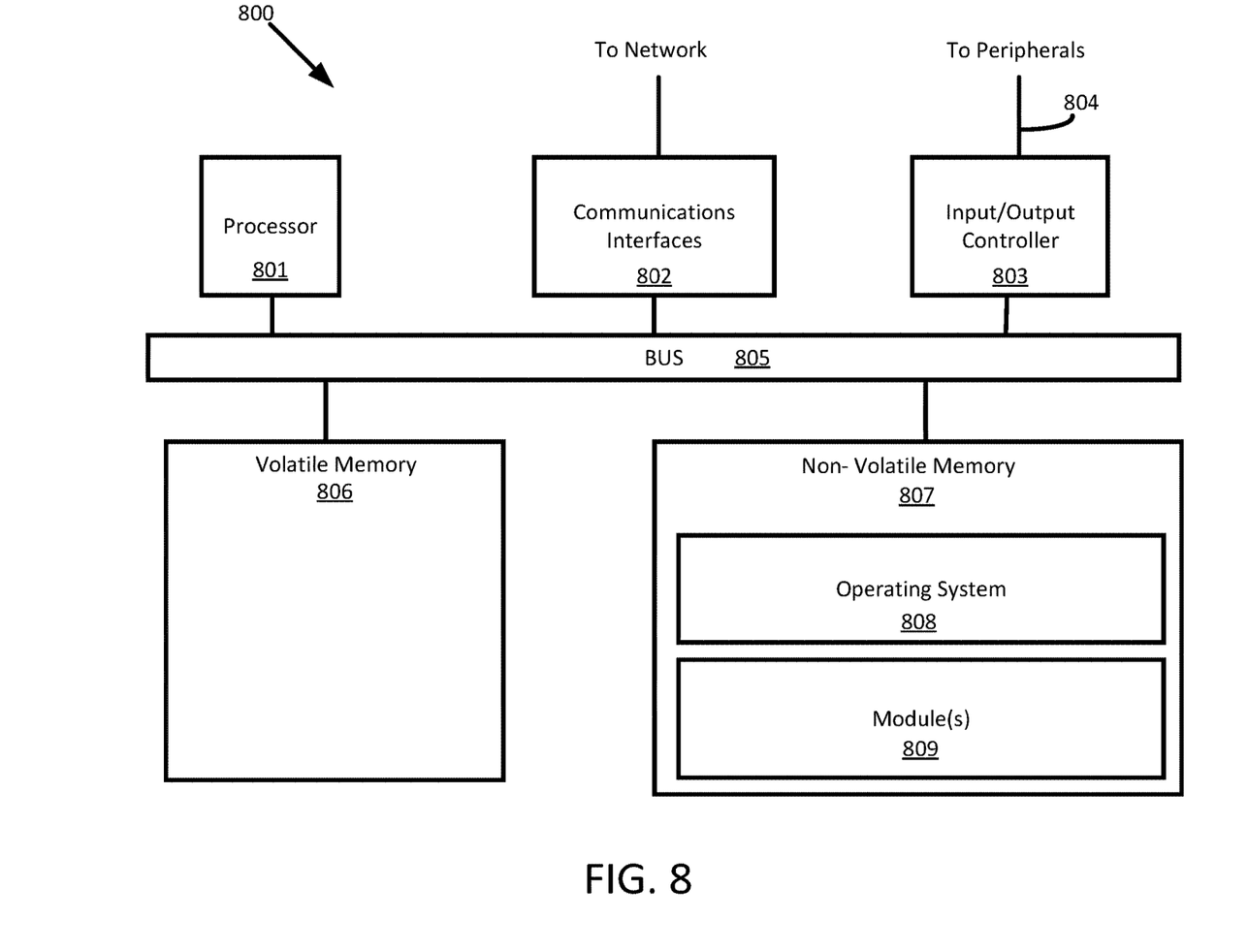
FIG. 8 illustrates an embodiment of a processing device for practicing various technologies and concepts disclosed herein.

FIG. 8 is an exemplary schematic diagram of a computer processing system that may be used in embodiments of various architectures, such as the architecture 100 shown in FIG. 1, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 8, the processing system 800 may include one or more processors 810 that may communicate with other elements within the processing system 800 via a bus 805. The processor 801 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 800 may also include one or more communications interfaces 802 for communicating data via a network 125 with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 803 may also communicate with one or more input devices or peripherals using an interface such as, but not limited to: a keyboard, a mouse, a touch screen/display input, microphone, pointing device, etc. The input/output controller 803 may also communicate with output devices or peripherals, such as displays, printers, speakers, headsets, banner displays, etc.

The processor 801 may be configured to execute instructions stored in volatile memory 806, non-volatile memory 807, or other forms of computer readable storage media accessible to the processor 801. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 807 may store program code and data, which also may be loaded into the volatile memory 806 at execution time. For example, the non-volatile memory 807 may store one or more modules 809 that may perform the above-mentioned process flows and/or operating system code 808 containing instructions for performing the process and/or functions associated with the technologies disclosed herein. The module(s) 809 may also access, generate, or store related data in the non-volatile memory 807, as well as in the volatile memory 806. The volatile memory 806 and/or non-volatile memory 807 may be used to store other information including, but not limited to: records, applications, programs, scripts, source code, object code, byte code, compiled code, interpreted code, machine code, executable instructions, or the like. These may be executed or processed by, for example, the processor 801 and may form a part of, or may interact with, the module(s) 809.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for providing a configuration over a network to a client application comprising:
receiving a request over the network at a configuration management service comprising a computer processor and storage, the request comprising one or more items that make up the configuration for the client application;
for each item found in the request:
determining by the computer processor whether the item is associated with a marker indicating configuration information for the item cannot be overwritten by the configuration management service;
in response to determining the item is associated with the marker indicating the configuration information for the item cannot be overwritten by the configuration management service, not retrieving any information from the storage for the item; and
in response to determining the item is not associated with the marker indicating the configuration information for the item cannot be overwritten by the configuration management service:
determining by the computer processor whether the item is associated with an entity;
retrieving information that is associated with the item and the entity from the storage by the computer processor for the configuration information for the item in response to determining the item is associated with the entity; and
retrieving information that is associated with the item and no entities from the storage by the computer processor for the configuration information for the item in response to determining the item is not associated with the entity; and
sending a response to the client application over the network, wherein the response comprises the configuration information for at least the items in the one or more items that are not associated with a marker indicating the configuration for the items cannot be overwritten by the configuration management service, and the configuration information returned in the response is used to configure at least one of one or more parameters and one or more initial settings for the client application.

2. The method of claim 1, wherein the entity comprises at least one of the client application and an instance of the client application.

3. The method of claim 1 further comprising broadcasting a beacon over the network, wherein the beacon is detectable by the client application to inform the client application the configuration management service is available.

4. The method of claim 3, wherein the beacon provides an endpoint to the client application to use in locating the computer processor for the configuration management service.

5. The method claim 3, wherein the beacon is broadcasted over the network using a User Datagram Protocol ("UDP") connection.

6. The method of claim 1, wherein the request and the response are sent over the network using a Representational State Transfer ("REST") architectural style.

7. The method of claim 6, wherein the request and the response over sent over the network using a Transmission Control Protocol ("TCP") connection.

8. A non-transitory, computer-readable medium comprising computer-executable instructions for providing a configuration over a network to a client application that when executed by a computer processor of a configuration management service are configured to cause the computer processor to:
receive a request over the network, the request comprising one or more items that make up the configuration for the client application;
for each item found in the request:
determine whether the item is associated with a marker indicating configuration information for the item cannot be overwritten by the configuration management service;
in response to determining the item is associated with the marker indicating the configuration information for the item cannot be overwritten by the configuration management service, not retrieve any information from a storage for the item; and
in response to determining the item is not associated with the marker indicating the configuration information for the item cannot be overwritten by the configuration management service:
determine whether the item is associated with an entity;
retrieve information that is associated with the item and the entity from the storage for the configuration information for the item in response to determining the item is associated with the entity; and
retrieve information that is associated with the item and no entities from the storage for the configuration information for the item in response to determining the item is not associated with the entity; and
send a response to the client application over the network, wherein the response comprises the configuration information for at least the items in the one or more items that are not associated with a marker indicating the configuration for the items cannot be overwritten by the configuration management service, and the configuration information returned in the response is used to configure at least one of one or more parameters and one or more initial settings for the client application.

9. The non-transitory, computer-readable medium of claim 8, wherein the entity comprises at least one of the client application and an instance of the client application.

10. The non-transitory, computer-readable medium of claim 8, wherein the computer-executable instructions are further configured to cause the computer processor to broadcast a beacon over the network that is detectable by the client application to inform the client application the configuration management service is available.

11. The non-transitory, computer-readable medium of claim 10, wherein the beacon provides an endpoint to the client application to use in locating the computer processor for the configuration management service.

12. The non-transitory, computer-readable medium claim 10, wherein the beacon is broadcasted over the network using a User Datagram Protocol ("UDP") connection.

13. The non-transitory, computer-readable medium of claim 8, wherein the request and the response are sent over the network using a Representational State Transfer ("REST") architectural style.

14. The non-transitory, computer-readable medium of claim 13, wherein the request and the response over sent over the network using a Transmission Control Protocol ("TCP") connection.

15. A system for providing a configuration from a configuration management service over a network to a client application comprising:
  storage; and
  a computer processor configured to:
    receive a request over the network, the request comprising one or more items that make up the configuration for the client application;
    for each item found in the request:
      determine whether the item is associated with a marker indicating configuration information for the item cannot be overwritten by the configuration management service;
      in response to determining the item is associated with the marker indicating the configuration information for the item cannot be overwritten by the configuration management service, not retrieve any information from the storage for the item; and
      in response to determining the item is not associated with the marker indicating the configuration information for the item cannot be overwritten by the configuration management service:
        determine whether the item is associated with an entity;
        retrieve information that is associated with the item and the entity from the storage for the configuration information for the item in response to determining the item is associated with the entity; and
        retrieve information that is associated with the item and no entities from the storage for the configuration information for the item in response to determining the item is not associated with the entity; and
    send a response to the client application over the network, wherein the response comprises the configuration information for at least the items in the one or more items that are not associated with a marker indicating the configuration for the items cannot be overwritten by the configuration management service, and the configuration information returned in the response is used to configure at least one of one or more parameters and one or more initial settings for the client application.

16. The system of claim 8, wherein the entity comprises at least one of the client application and an instance of the client application.

17. The system of claim 8, wherein the computer-executable instructions are further configured to cause the computer processor to broadcast a beacon over the network that is detectable by the client application to inform the client application the configuration management service is available.

18. The system of claim 10, wherein the beacon provides an endpoint to the client application to use in locating the computer processor for the configuration management service.

19. The system claim 10, wherein the beacon is broadcasted over the network using a User Datagram Protocol ("UDP") connection.

20. The system of claim 8, wherein the request and the response are sent over the network using a Representational State Transfer ("REST") architectural style.

21. The system of claim 13, wherein the request and the response over sent over the network using a Transmission Control Protocol ("TCP") connection.

* * * * *